United States Patent [19]

Bealkowski et al.

[11] Patent Number: 5,307,482
[45] Date of Patent: Apr. 26, 1994

[54] COMPUTER, NON-MASKABLE INTERRUPT TRACE ROUTINE OVERRIDE

[75] Inventors: Richard Bealkowski, Delray; Ralph M. Begun; Michael R. Turner, both of Boca Raton, all of Fla.

[73] Assignee: International Business Machines Corp., Armonk, N.Y.

[21] Appl. No.: 826,733

[22] Filed: Jan. 28, 1992

[51] Int. Cl.$^5$ .............................................. G06F 11/08
[52] U.S. Cl. .................................. 395/575; 395/500
[58] Field of Search ................ 395/575, 700, 500; 371/19

[56] References Cited

U.S. PATENT DOCUMENTS

| | | | |
|---|---|---|---|
| 4,334,307 | 6/1982 | Bourgeois et al. | 364/200 |
| 4,423,508 | 12/1983 | Shiozaki et al. | 371/16 |
| 4,489,380 | 12/1984 | Carey et al. | 364/200 |
| 4,593,391 | 6/1986 | Mizushima et al. | 371/15 |
| 4,695,946 | 9/1987 | Andreasen et al. | 364/200 |
| 4,701,845 | 10/1987 | Andreasen et al. | 364/200 |
| 4,726,024 | 2/1988 | Guziak et al. | 371/16 |
| 4,799,145 | 1/1989 | Goss et al. | 395/700 |
| 4,819,159 | 4/1989 | Shipley et al. | 364/200 |
| 4,833,594 | 5/1989 | Familetti et al. | 395/700 |
| 4,862,349 | 8/1989 | Foreman et al. | 395/700 |
| 4,890,284 | 12/1989 | Murphy et al. | 371/9.1 |
| 5,012,409 | 5/1991 | Fletcher et al. | 364/200 |
| 5,138,706 | 8/1992 | Melo et al. | 395/500 |
| 5,155,838 | 10/1992 | Kishi | 395/500 |
| 5,179,690 | 1/1993 | Ishikawa | 395/500 |

OTHER PUBLICATIONS

IBM Technical Disclosure Bulletin, vol. 30, No. 5, Oct. 1987, "Diagnostic Status for Non-Maskable Interrupt Arbitration", pp. 67–68.
IBM Technical Disclosure Bulletin, vol. 32, No. 5A, Oct. 1989, "Enhanced Hardware Error Recovery for Microprocessor", pp. 441–442.

Primary Examiner—Robert W. Beausoliel, Jr.
Assistant Examiner—Albert Decady
Attorney, Agent, or Firm—Robert S. Babayi

[57] ABSTRACT

System non-maskable interrupts are detected by an override controller which initiates an NMI routine override operation. During override, address requests for an standard NMI routine are intercepted, and instead a predetermined memory space is addressed that contains a system specific NMI trace routine. The processor is unaware that the override controller has inserted the system specific NMI routines. The processor executes the system specific NMI routines, and when the specific routines are completed, the override controller generates a termination signal which returns program control back to the standard NMI routine. The system specific NMI routine is designed to trace errors created by new system functions or hardware or to enhance the error tracing capability for existing system functions.

20 Claims, 7 Drawing Sheets

COMPUTER, NON-MASKABLE INTERRUPT TRACE ROUTINE OVERRIDE

BACKGROUND OF THE INVENTION

1. Field of the Invention

This invention is directed to computers and particularly families of related computer products that are rapidly evolving and adding new function. In particular the invention relates to a method and apparatus for handling non-maskable interrupts in rapidly evolving related computer products. Personal computers are such a family of products. Many of these personal computers are programmed to invoke generalized error trace routines when a non-maskable interrupt (NMI) occurs in the system. The present invention is directed to adding new error trace routines specific to new functions in new computing systems.

2. Description of Prior Art

The IBM Personal System/2 (PS/2) family of computers typically utilizes either the Disk Operating System (DOS) program or the Operating System/2 (OS/2) program as its system program. Application programs to perform word-processing functions, spreadsheet functions, database functions, etc., run on top of one of these operating system programs. In other words the application programs are written to interface with the operating system program.

The operating system program contains within it a non-maskable interrupt (NMI) trace routine that is useable across the family of PS/2 computers. When an error or fault occurs that generates an NMI, the interrupt controller notifies the system processor and invokes a generalized NMI trace routine provided by the operating system program. These NMI routines are designed to trace errors or faults in system features known as of the most recent version of the operating system program.

A problem exists in keeping the NMI routines in the operating system up to date with the rapidly evolving set of system features offered by the PS/2 computer family. New features in devices that attach to the PS/2 computers are added daily, and the PS/2 computer family itself adds models or model enhancements every few months. When an error or fault occurs during the operation of one of these new features or functions, the operating system will look to invoke an NMI routine. However if the NMI trace routine cannot recognize or take advantage of these new features, it will not be able to properly diagnose the source of the problem.

One skilled in the computing system arts will realize it is not practical to add a new NMI trace routine to the operating system on a daily or even monthly basis. The problem is thus how to deal with the need for rapidly evolving NMI routines which can keep pace with rapidly evolving computing systems.

Prior teachings do not offer a solution to this problem. The generation of non-maskable interrupts and the invoking of NMI routines is of course well known and a few examples include: (1) M. E. Dean et al, "Diagnostic Status for Non-Maskable Interrupt Arbitration," *IBM Technical Disclosure Bulletin,* Vol. 30, No 5, October 1987, pp. 67-68; and (2) B. O. Anthony et al, "Enhanced Hardware Error Recovery for Microprocessor," *IBM Technical Disclosure Bulletin,* Vol. 32, No. 5A, October 1989, pp. 441-442. The Dean et al publication teaches a program technique for initiating a diagnostic routine when an NMI occurs. The Anthony et al publication teaches a timeout sequence for forcing an NMI routine.

In addition, the invoking of error trace routines when faults occur is well-known. Some examples include: (1) K. Shiozaki et al, "Logic Tracing Apparatus," U.S. Pat. No. 4,423,508; and (2) D. R. Bourgeois et al, "Data Processing System With Self Testing and Configuration Mapping Capability," U.S. Pat. No. 4,334,307. The Shiozaki et al patent teaches hardware failure tracing apparatus that both stops memory writing in order to store data at time of error and puts a hold on memory writing so that other test programs will not inadvertently overwrite the stored error data. The Bourgeois et al patent teaches a particular power-on self-test routine for a computing system. The routine involves successively testing sections of memory and then using tested sections of memory to store test results from tests on other sections of memory and tests on I/0 devices in the computing system.

None of these publications or patents address or provide a solution to the problem of how to provide new NMI routines in an environment where computing systems are changing rapidly.

SUMMARY OF THE INVENTION

It is an object of this invention to update NMI routines in a new system or a system with added new functions without changing the operating system.

It is a further object to invoke new NMI routines in a manner such that their operation is transparent to the computing system and the operating system.

It is also an object of this invention to provide for the addition of hardware and software to implement new added NMI functions in a manner that is independent of pre-existing operations by the computing system and operating system.

In accordance with this invention, the above problem is solved, and the above objects are accomplished, by overriding the NMI operation of the general or standard NMI routines in the operating system with system specific NMI routines. Non-maskable interrupts are detected by an override controller which initiates the override operation. During override, address requests from the processor for the general or standard NMI routine are intercepted, and memory controls and addresses are generated by the override controller. A predetermined memory space is addressed that contains the system specific NMI trace routine. The processor is unaware that the override controller has inserted the system specific NMI routines.

The processor executes the system specific NMI routines and when the specific routines are completed, the override controller generates a termination signal which returns program control back to the NMI routine in the operating system. Thus, the processor works with both the system specific NMI routine and the existing operating system NMI routines.

The system specific NMI routine is designed to trace errors created by functions or hardware in one or more new systems or to enhance the error tracing capability for existing system functions. The routines store data conditions as they existed at the time of the error. The specific NMI routines are stored in read only memory (ROM) outside normal working memory space. Since the NMI routines are specific to the system, the updated NMI routines need not be in the operating system but are better stored in ROM of their new system.

Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 1:
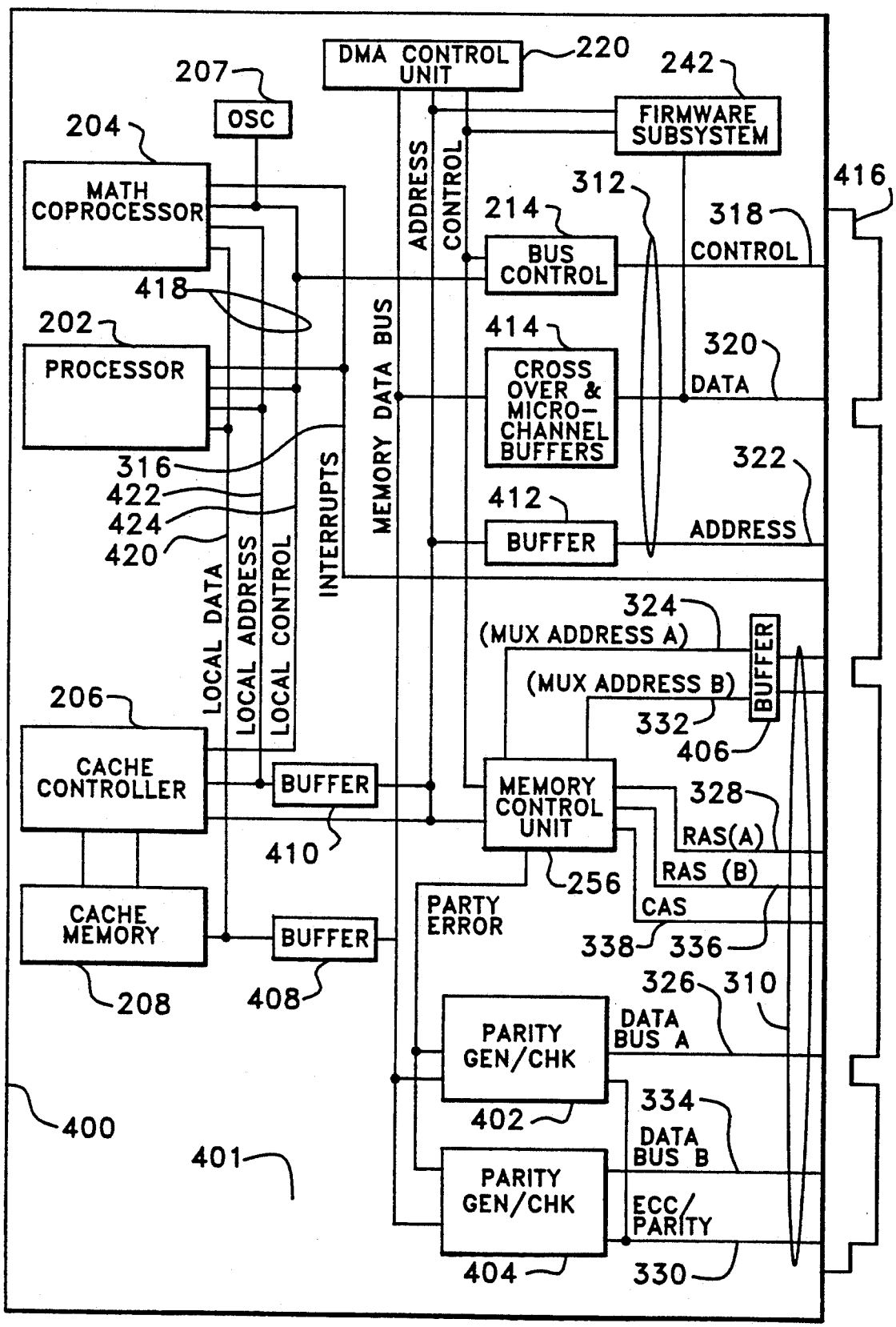
FIGS. 1 and 2 show a processor card and planar board, respectively, of a personal computer in which the preferred embodiment of the invention would be implemented.
Figure 2:
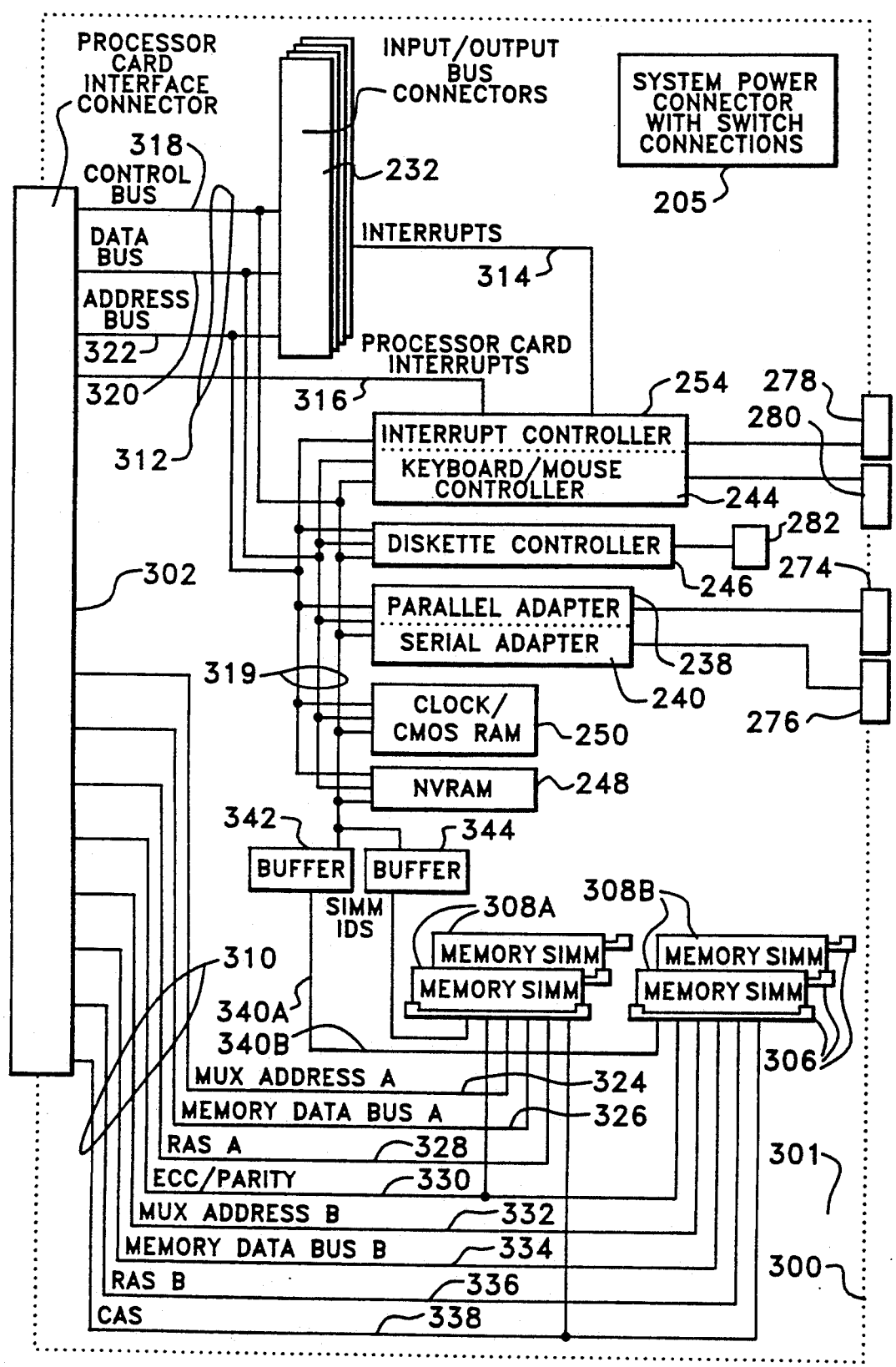

The computing system in which the present invention is used is illustrated in FIGS. 1 and 2. These Figures show a processor card (FIG. 1) and a planar board (FIG. 2). The processor card and planar board in these Figures are illustrative of the IBM Personal System/2 Models 90 and 95 computers. FIGS. 1 and 2 are reproductions of FIGS. 4 and 3, respectively, in copending, commonly assigned patent application Ser. No. 07/799486, filed Nov. 27, 1991. The processor card and planar board are described in that copending application, which is incorporated herein by reference, and are only described herein as necessary to understand how they are modified in the present invention.

In Figure processor 202 and math coprocessor 204 are connected to a cache memory 208 and cache controller 206 through a high speed local bus 418. For operations beyond the local bus the processors are connected to the planar board (FIG. 2) via MICRO CHANNEL bus 312 and memory bus 310. The connections to the memory bus and MICRO CHANNEL bus are buffered through buffers 408, 410, 412 and 414. Control and coordination of these various buses is handled by the bus control 214 in cooperation with the processors 202 and 204, the memory control unit 256 and the DMA control unit 220. System interrupts are communicated over bidirectional bus 316 between processors 202 and 204 and interrupt controller 254 (FIG. 2).

Firmware subsystem 242 contains read only memory (ROM) in which various microcode programs reside including BIOS, and POST. BIOS (Basic Input Output System) provides an interface between the hardware and the operating system software. POST is the power-on self-test routine performed by the system each time it is turned on.

Figure 3:
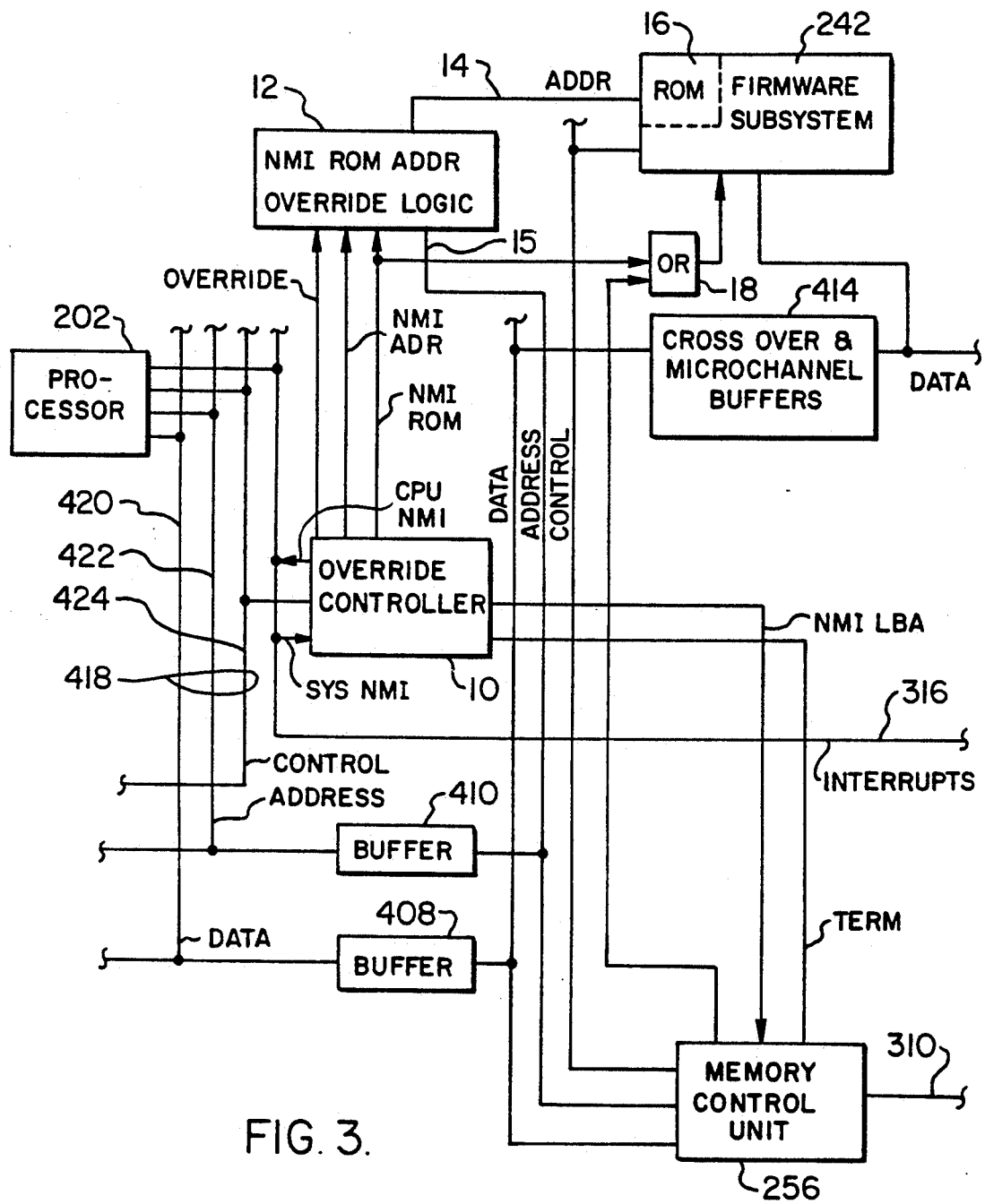
FIG. 3 is a system diagram of a preferred embodiment of the invention working in combination with the system of FIGS. 1 and 2.

In its preferred embodiment, the present invention modifies the system of FIGS. 1 and 2 as shown in FIG. 3 so that the manner in which the system handles system non-maskable interrupts can be tailored to the specific computing system. In FIG. 3, the override controller 10 responds to System NMI on the interrupt bus 316. The interrupt bus 316 is bidirectional and connects to the interrupt controller 254 (FIG. 2). Interrupt controller 254 collects all the non-maskable interrupts and signals the SYS NMI to the processor 202. Processor 202 executes the system specific NMI routine through the override controller 10 followed by the generalized NMI routine through the memory control unit 256 (FIG. 1).

Normally, the standard or existing NMI routine is supplied by the operating system and is stored in memory 308 (FIG. 2). The system specific NMI routine is stored in read only memory (ROM) 16 inside firmware subsystem 242. When there is a System NMI, override controller 10 intercepts memory requests from processor 202 and addresses ROM 16.

The switching of memory fetches from processor 202 so that the address goes to ROM 16 in firmware subsystem 242 is transparent to the processor. Override controller 10 sends a NMI LBA (NMI Local Bus Access) signal to memory control unit 256 and an override signal to NMI ROM address override logic 12. The NMI LBA signals the memory control unit 256 to ignore address and control signals from processor 202. The override signal tells address override logic 12 to set the start address of the system NMI routine. Override controller 10 also sends an NMI ROM signal to NMI ROM address override logic 12. Address override 12 intercepts the address signal from the processor via buffer 410 and inserts ROM address of the specific NMI routine. This address from the address override is passed by address bus 14 to ROM 16 in firmware subsystem 242. The NMI ROM signal is also sent via OR 18 to ROM 16 in firmware subsystem 242 to enable the reading of the address location in the ROM.

Override controller 10 monitors the control bus 424 to detect when processor 202 has issued a memory code read cycle or code fetch. In response to this code fetch, controller 10 generates an NMI ADR signal and passes it to the address override 12. The NMI ADR signal increments the ROM address for the system specific NMI routine in ROM 16. Processor 202 then receives data or instruction from ROM 16 over the data bus via buffers 414 and 408. In this manner processor 202 works with override controller 10, override logic 12 and ROM 16 to perform the system specific NMI routine.

The last step of the system specific routine is to set a TERM bit to signal the override controller 10 that the system NMI routine is finished. The TERM bit might be set in any register as a flag to the processor. In the preferred embodiment, the TERM bit is set in the memory control unit 256 via buffer 410. Memory control unit 256 generates the TERM (termination) signal for override controller 10. Override controller 10 drops the OVERRIDE signal to the address override logic 12 and regenerates a CPU NMI signal that is sent to processor 202. Processor 202 then executes the normal NMI routine in memory 308 (FIG. 2) via memory control unit 256.

Figure 4:
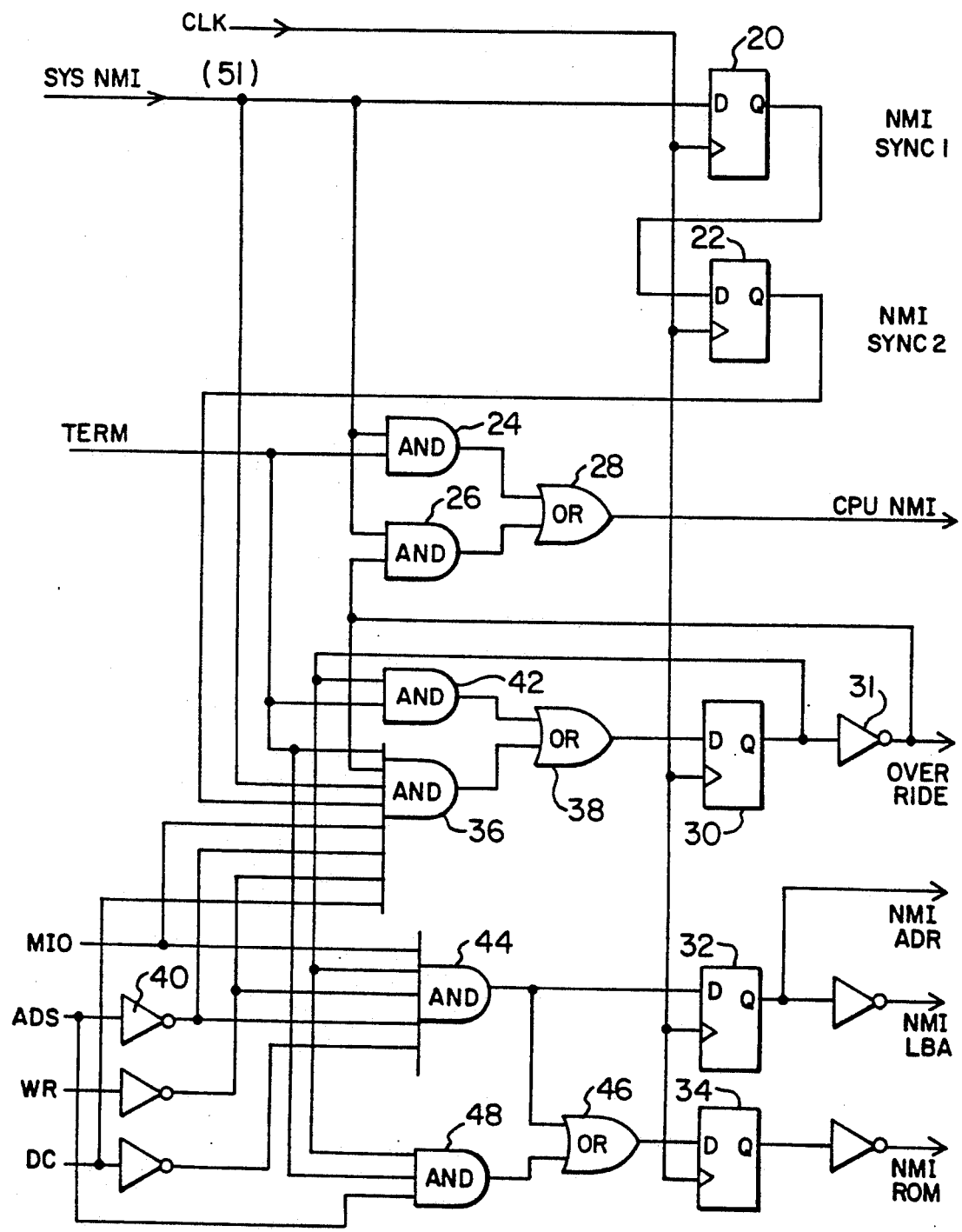
FIG. 4 is a logic block diagram of the override controller in FIG. 3.

FIG. 4 is a logic block diagram for the override controller 10. The controller can be implemented either with logic devices or with programmable array logic. The functions of the controller are most easily understood by reference to the logic block diagram in FIG. 4 and the signal timing chart in FIG. 5.

When the SYS NMI (System NMI) signal is received latches 20 and 22 are set by successive mid-cycle transitions of the clock signal. In effect the SYS NMI generates an NMI SYNC2 signal delayed two clock cycles from the SYS NMI transition. The purpose is to sync the override controller with cycles in processor 202. The transition of SYS NMI from low to high also enables AND gates 24 and 26. Since the TERM signal is high, CPU NMI signal goes high via AND 24 and OR 28. CPU NMI signal is passed back to processor 202 which calls the NMI routine by generating a memory code fetch (memory code read cycle).

A memory code fetch consists of the presence of four signals from processor 202 on local control bus 424 (FIG. 1). The four signals are MIO (memory input/output), ADS (Address Strobe), WR (Write/Read), and DC (data/code). These are standard signals specified and defined in the *Intel 486 DX Microprocessor Data Book,* June 1991, (Intel Order 240440-004) for Intel 486 processor chips manufactured by Intel Corporation.

The memory fetch code condition is used to trigger the override, the NMI LBA, and the NMI ROM signals by setting latches 30, 32 and 34, respectively. The latch 30 is set by AND 36 via OR 38. AND 36 is satisfied by override being high (override is active when override signal is low due to inverter 31), SYS NMI being high, NMI SYNC2 being high, the ADS strobe pulsing low (due to inverter 40) while MIO, inverted WR, inverted DC are high. In effect, AND 36 will generate a pulse indicating a memory read request from processor 202 when an override does not already exist and a SYS NMI has occurred. Once the override latch 30 is set, the low OVERRIDE signal is fed back from inverter 31 to AND 36 to inhibit the AND during the override operation. The high OVERRIDE signal is fed back to AND 42 and effective holds override latch 30 high until the TERM signal goes low. The TERM signal goes low when the system specific NMI routine is completed.

Latch 32 generates both the NMI LBA signal (inverted latch output) and the NMI ADR signal. Latch 32 is set by AND 44 which is satisfied by the memory read or fetch code occurring after the override latch 30 is set. Latch 32 is reset during the next clock cycle when the read fetch code is absent (the output of AND 44 is low). The NMI ADR signal occurring once each memory read code is used to increment the address for the NMI error trace routine as will be described below in reference to FIG. 6.

The NMI ROM latch 34 is set by AND 44 via OR 46. However, latch 34 is not reset during the next clock cycle since AND 48 is held high by the ADS signal being ANDed with TERM and the set condition on override latch 30. Ultimately, when the TERM signal drops at completion of the system specific NMI routine, AND 48 goes low and latch 34 is set low. The NMI ROM signal, which is active low during override, then goes high.

Figure 5:
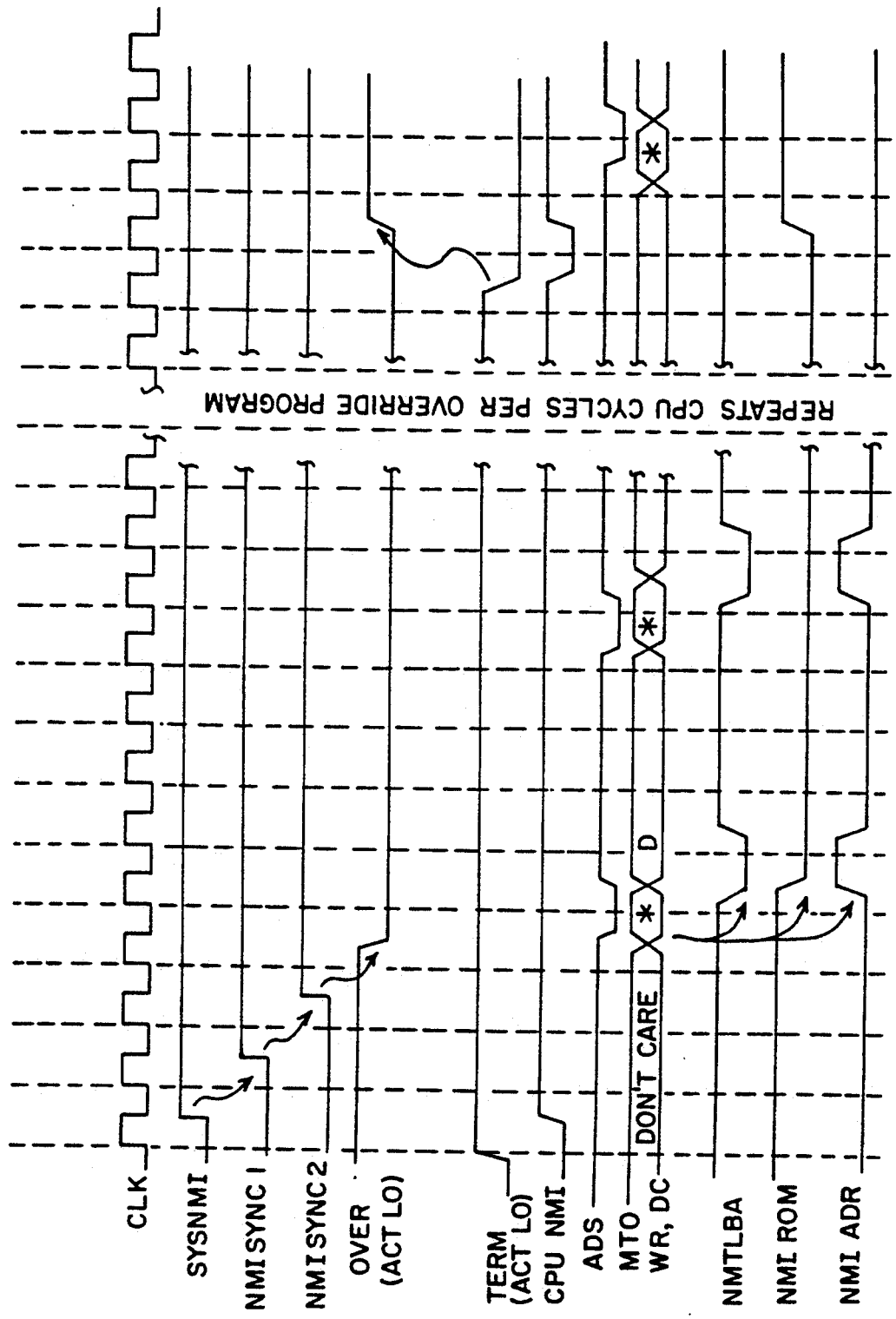
FIG. 5 is a signal timing chart for the signals in FIGS. 4 and 6.
Figure 6:
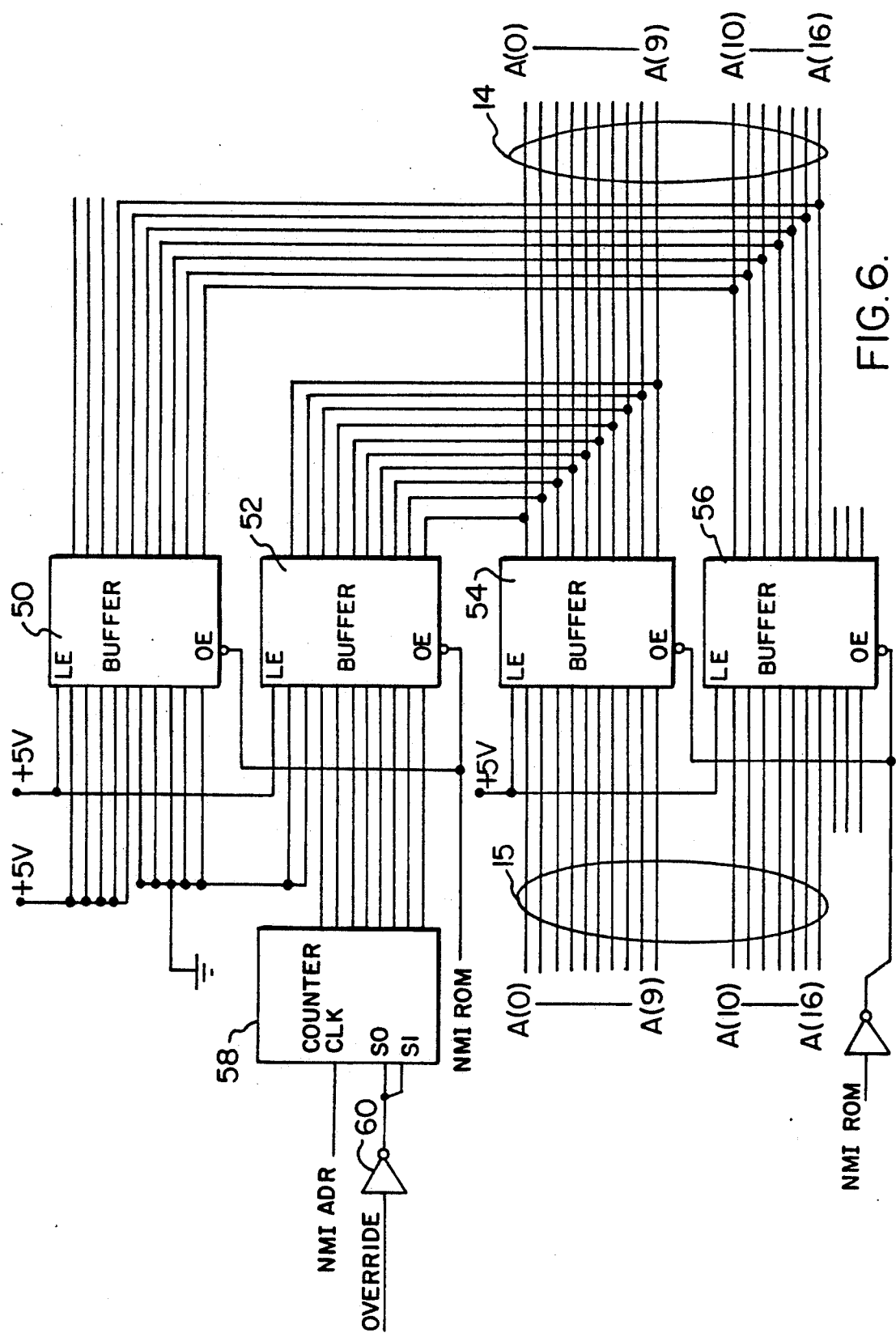
FIG. 6 is a block diagram of the override address logic in FIG. 3.

In FIG. 6, the NMI ROM address override logic 12 (FIG. 3) is shown in detail. It comprises four address buffer registers and a counter. Buffer registers 50 and 52 are the address registers for the override operation; i.e., the system specific NMI routine address registers. Their output enabled or inhibited by NMI ROM signal. As shown in FIG. 5, NMI ROM signal is low during override. When NMI ROM is low, buffer registers 50 and 52 are enabled and will provide the address on address bus 14. When NMI ROM is high, buffer registers 50 and 52 are inhibited.

Buffer registers 54 and 56 provide the ROM address when there is no override; i.e., during normal operations with ROM 16 such as POST (power-on self-test). The inverted NMI ROM signal enables registers 54 and 56 during non-override conditions and inhibits them during override conditions. Registers 54 and 56 buffer the addresses supplied on address bus 15.

The NMI routine addresses are generated at registers 50 and 52. Register 50 is preset to a start address for the routine. Register 52 receives its contents from counter 58. Counter 58 is held at zero during normal or non-override conditions by the inverted OVERRIDE signal from inverter 60. During override, the inverted OVERRIDE signal enables the counter to be incremented by each pulse of the NMI ADR signal. There is an NMI ADR pulse signal for each memory read or fetch code from processor 202.

Figure 7:
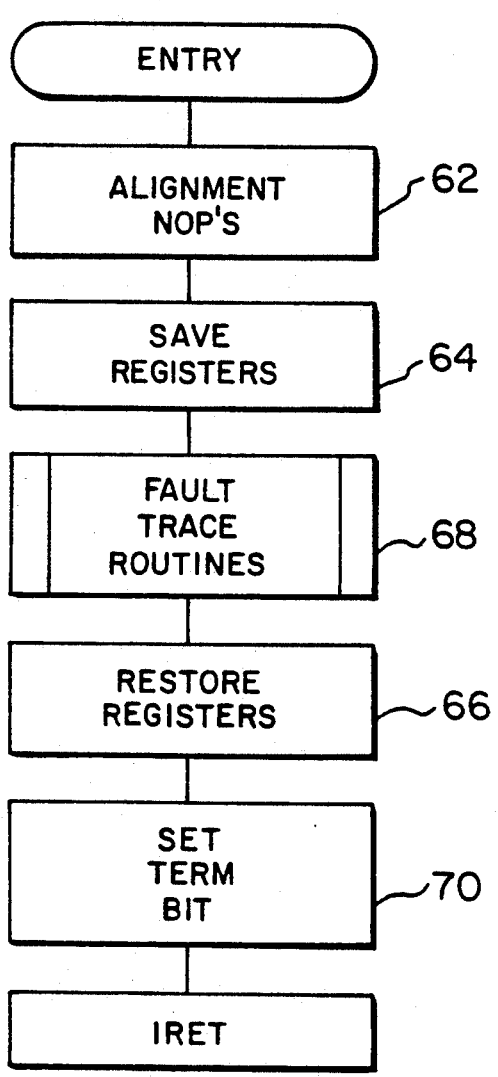
FIG. 7 is a flow diagram of the system specific NMI routine.

FIG. 7 is a flow diagram of the preferred embodiment of the system specific NMI tracer routine stored in ROM 16. In step 62 the tracer routine provides alignment NOP (No Operation) commands back to processor 202. This is necessary to align address requests from processor 202 with the start address of the system specific NMI routine. The commands from the tracer routine are returned from ROM 16 to processor 202 for execution over the data bus 420 via buffers 414 and 408. Normally, the width of this data bus is a multiple of an addressable unit of storage (usually one byte). However for higher performance, processor 202 in the preferred embodiment uses a four or more byte wide local data bus 420. When this occurs, the low order address bits are used for byte addressing internally, and the low order address lines are not present on the local address bus 422. This introduces the concept of a transferable unit where a memory fetch will result in a return of four or more bytes (a transferable unit) rather than one byte.

When the processor 202 requests stored program commands or instructions from the memory control unit 256, the processor 202 optimizes the request. This request will be for a transferable unit. One way to address this transferable unit is to truncate the two low order address bits when the local data bus 420 is four bytes wide.

To illustrate the need for alignment of requests with commands, assume a programmer places a program at location 3 (see TABLE 1 below) in processor memory 308 (FIG. 2). When the processor 202 requests the instructions at that address, it computes the local address bus 422 address of location 3. The local address bus 422 address for location 3 is 0 (TABLE 2). What the processor receives is the data for locations 0 through 3 in TABLE 1. In effect, processor 202 sees the bytes addressed as shown in TABLE 2 below.

TABLE 1

| | |
|---|---|
| 0 | |
| 1 | |
| 2 | |
| 3 | START OF PROGRAM 999 |
| 4 | PROGRAM |
| 5 | PROGRAM |
| 6 | END OF PROGRAM 999 |
| 7 | |
| 8 | |
| 9 | |
| A | |
| B | |

TABLE 2

| PROCESSOR'S VIEW OF MEMORY LOCATIONS 0 THROUGH B | |
|---|---|
| 0 | CONTAINS BYTES 3, 2, 1, 0 |
| 4 | CONTAINS BYTES 7, 6, 5, 4 |

TABLE 2-continued

PROCESSOR'S VIEW OF MEMORY LOCATIONS 0 THROUGH B

| 8 | CONTAINS BYTES B, A, 9, 8 |
|---|---|

Without prior knowledge of every programmers code, it is not possible to determine which of the four bytes transferred is the starting address of the program. However, based on the actions of the processor when transferring control to the program, a transferable unit address can be determined. Therefore, a method to align program address with requests from the processor 202 is required. The solution is to make all four bytes of data in the first request for instructions a one byte NOP instruction that does nothing.

Referring to TABLE 3 below, assume that the program 999 in TABLE 1 is the existing operating system NMI routine. When the hardware logic is triggered by a system NMI event, the processor 202 attempts to start executing the program 999 at location 3 in memory 308 (FIG. 2). However, when the processor requests memory 308 location 0, the override controller 10 and override logic 12 convert that request to an address in ROM 16 in firmware subsystem 242. The address 3 is NOT transmitted on the local address bus 422; only the transferable unit address 0 is available. The firmware returns the four bytes of NOPs. Correct execution occurs as a NOP is a valid instruction. The processor 202 continues to fetch program instructions or commands sequentially, and the system NMI specific routine in ROM 16 begins execution.

TABLE 3

| 0 | NOP |
|---|---|
| 1 | NOP |
| 2 | NOP |
| 3 | NOP |
| 4 | START OF NMI ROUTINE |
| 5 | NMI TRACER ROUTINE |
| 6 | END OF NMI ROUTINE |
| 7 | |
| 8 | |
| 9 | |
| A | |
| B | |

In FIG. 7 after the alignment NOP's, step 64 of the NMI tracer routine saves the contents of the general working registers of the system to a stack reserved for processor 202. (A stack is a reserved area in memory that is used by certain processor 202 operations.) The contents of the general registers must be saved in order to restore the system after the NMI routine is completed. The NMI tracer routine will use the general registers during execution of the tracer routines. Step 66 of the NMI routine, after completion of the tracer routines, reads the saved contents of general registers from the stack and restores those contents back to the general registers.

Step 68 in FIG. 7 comprises multiple fault tracing routines. The fault tracing routines would be designed to trace faults in functions where the functions are new to the system or where the functions are old but new error recording capability has been added to assist diagnosing errors in the old function. These new fault trace routines would not be in the standard NMI routine and could have applicability to one or more systems. In other words, the routines in step 68, and therefore the system specific NMI routine, may be designed for one specific system or multiple specific systems.

The function of the fault trace routines is to retrieve error data from the device or devices generating an NMI and storing that error data in NVRAM 248 (FIG. 2). Each of the fault tracing routines is similar in structure; a portion of the fault trace routine illustrating three examples of error data retrieval is shown in FIG. 8.

Figure 8:
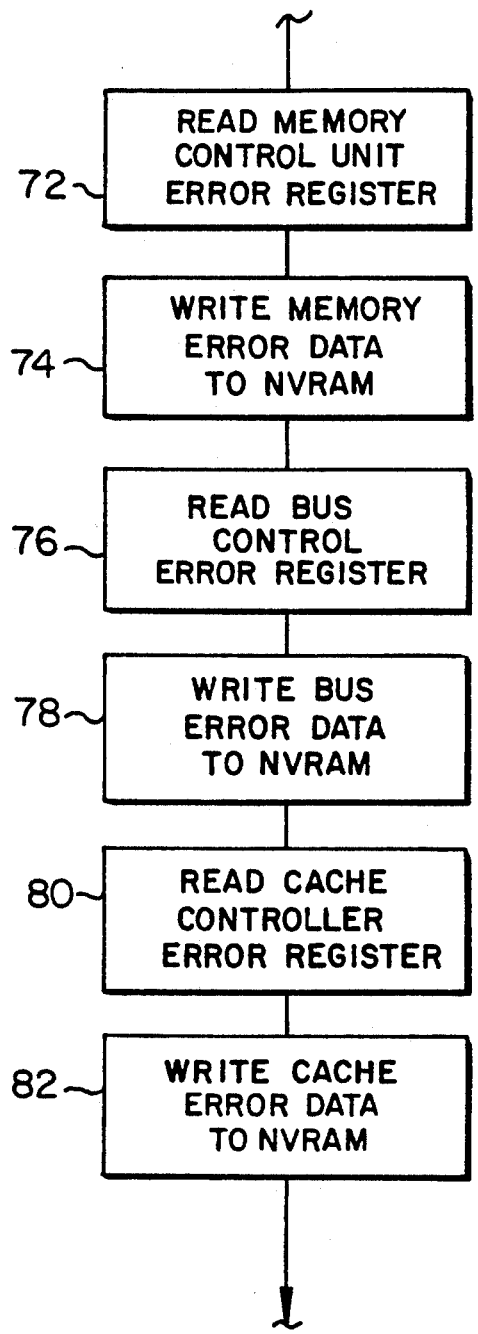
FIG. 8 is a flow diagram of one example of a trace routine in the system specific NMI routine of FIG. 7.

In step 72 of FIG. 8, the trace routine reads the error register in memory control unit 256. If memory control unit 256 had generated the NMI, it will have written error data to its error register. The error data would contain information about the error or fault that occurred in the memory system. In step 74 the memory error data read in step 72 is written into NVRAM 248 (FIG. 2). The memory error data is held in NVRAM for later use by a diagnostic routine.

Steps 76 and 78, and steps 80 and 82 operate in the same manner as steps 72 and 74 just described. Steps 76 an 78 transfer bus error data from the error register in bus control 214 to NVRAM 248. Steps 80 and 82 transfer cache error data from the error register in cache controller 206 to NVRAM 248. Any number of other device error registers could be similarly read and have their error data transferred to NVRAM by the system specific fault trace routines.

After the fault trace routines have been completed and step 66 has restored the general registers in the system, step 70 sets the term bit. Processor 202 in executing step 70 sends the term bit over the data bus 420 through buffer 408 to memory control unit 256. The term bit sets a predetermined bit position in a register in the memory control unit. When this bit position is set, memory control unit 256 generates the termination (TERM) signal which is sent to the override controller 10. Override controller drops the OVERRIDE signal and sends the CPU NMI signal back to processor 202. Processor 202 then fetches the generalized NMI routine in memory 308 through memory control unit 256. Thus, the system specific NMI routine has been executed and the operation has been transparent to the processor and in addition to the generalized NMI routine provided by the operating system.

While a preferred embodiment of the invention has been shown and described, it will be appreciated by one skilled in the art, that a number of further variations or modifications may be made without departing from the spirit and scope of my invention.

What is claimed is:

1. In a computing system having a processor, means for generating non-maskable interrupts (NMI's), the processor responsive to an NMI for generating a fetch code for fetching an existing NMI fault tracing routine for use by the processor, apparatus responsive to NMI's for adding system specific NMI routines to the system wherein the system specific NMI routines are fault tracing routines for new function or new hardware in the system or for enhancement of the fault tracing capability of the existing fault tracing routine, said apparatus comprising:

first means for storing the existing NMI routine;

second means for storing the system specific NMI routine;

address logic means for generating addresses to fetch the system specific NMI routine from said second storing means;

override control means responsive to an NMI for controlling said first storing means to ignore fetch codes from the processor and for invoking said address logic means;

said address logic means responsive to said override control means and to fetch codes from said processor for generating the address in said second storing means for fetching and passing the system specific NMI routine to the processor whereby the processor executes the system specific NMI routine.

2. The apparatus of claim 1 wherein the processor sets a terminations signal when completing the system specific NMI routine and in addition:

said override control means responsive to the termination signal for terminating control of said first storing means; and said processor addressing and executing the existing NMI routine in said first storing means.

3. The apparatus of claim 1 wherein said override control means comprises:

means responsive to an NMI for generating an override signal;

means responsive to the override signal for setting a predetermined start address for the system specific NMI routine and for incrementing the address each time a fetch code is received from the processor.

4. The apparatus of claim 3 and in addition:

executing means in the processor traces system specific faults during execution of the system specific NMI routine.

5. The apparatus of claim 4 wherein said executing means further comprises:

means for aligning memory fetch requests from the processor with stored instructions of the NMI routine.

6. The apparatus of claim 5 wherein the computing system has general registers and said executing means further comprises:

means for saving the contents of system general registers before execution of the fault tracing instructions; and means for restoring the contents of the system general registers after execution of the fault tracing instructions.

7. The apparatus of claim 5 wherein the processor sets a termination signal when completing the system specific NMI routine and in addition:

said override control means responsive to the termination signal for terminating control of said first storing means; and said processor addressing and executing the existing NMI routine in said first storing means.

8. In a computing system a method for inserting a new non-maskable interrupt (NMI) routine in existing NMI routines without altering the existing NMI routines, said existing NMI routine for tracing faults in existing features in the computing system and said new NMI routine for tracing faults in added or enhanced features in the computing system, said method comprising the steps of:

detecting a system NMI indicating a fault in the system including added or enhanced features in the system;

inhibiting addressing of the existing NMI routine;

generating an address to fetch the new NMI routine in place of the existing NMI routine;

executing the new NMI routine to trace a fault in the added or enhanced features;

setting a termination signal indicating the termination of the new NMI routine;

in response to the termination signal stopping said inhibiting and generating steps and thereby fetching the existing NMI routine; and executing the existing NMI routine to trace a fault in the system features other than the added or enhanced features.

9. The method of claim 8 wherein said executing step issues fetch requests for steps in the NMI routines and said generating step comprises:

selecting a preset address for the first address of the new NMI routine;

incrementing the new NMI routine address in response to each fetch request by said executing step during execution of the new NMI routine.

10. The method of claim 9 wherein said generating step further comprises the step of:

aligning the executing step fetch requests to the stored location of instructions in the new NMI routine.

11. The method of claim 9 wherein said executing step, when executing new NMI routines, comprises:

executing fault tracing routines associated with the added or enhanced feature;

each fault tracing routine transferring error data from error registers, associated with the added or enhanced feature, to non-volatile storage.

12. The method of claim 11 wherein said executing step further comprises the steps of:

saving the state of general registers in the computing system prior to execution of the fault trace routines;

restoring the state of the system general registers after the execution of the fault trace routines.

13. The method of claim 8 wherein said executing step comprises:

executing fault tracing routines;

each fault tracing routine transferring error data from error registers, to non-volatile storage.

14. The method of claim 13 wherein said executing step further comprises the steps of:

saving the state of general registers in the computing system prior to execution of the fault trace routines;

restoring the state of the system general registers after the execution of the fault trace routines.

15. Apparatus for adding a system specific NMI routine to an operating system NMI routine in a computing system, said computing system having a processor, memory, input/output devices, and an operating system, said operating system NMI routine being provided by the operating system and being used to trace faults in existing features of the computing system, said system specific NMI routine for tracing faults in features added to the computing system, and said computing system generating system NMI's in response to faults in existing or added features of the computing system, said apparatus comprising:

means for detecting a system NMI;

memory control means for controlling storage and retrieval of the operating system NMI routine in memory;

firmware subsystem means for storing the system specific NMI routine in non-volatile storage;

override control means responsive to the detected system NMI for generating a memory control signal and an override control signal;

said memory control means in response to said memory control signal ignoring requests from the processor for commands from the operating system NMI routine;

address logic means responsive to the override control signal and to requests from the processor for commands from the operating system NMI routine for generating an address to retrieve commands from the system specific NMI routine from said firmware subsystem means;

means including said processor for executing said system specific NMI routine command and for fetching the next command from the system specific NMI routine through said address logic means;

means in response to a last command from the system specific NMI routine for terminating the override control signal and the memory control signal whereby said address logic means no longer generates addresses for the system specific NMI routine and said memory control means in response to requests from the processor retrieves commands in the operating system NMI routine from memory.

16. The apparatus of claim 15 wherein:

said override control means responsive to the override control signal and requests for NMI commands from said processor for converting a first request to a start system specific NMI signal and for converting subsequent requests to an NMI address increment signal;

said address logic means responsive to the override control signal and the start signal from said override control means for setting the generated address to the start address of the system specific NMI routine in the firmware subsystem means;

said address logic means responsive to override control signal and the increment signal for incrementing addresses of the system specific NMI routine in the firmware subsystem means.

17. The apparatus of claim 16 wherein said means for executing comprises:

means for executing fault tracing routines;

means for storing the results of the fault tracing routines.

18. The apparatus of claim 17 wherein said computing system has system registers and said means for executing further comprises:

means for saving the contents of system registers in memory prior to the execution of the fault tracing routines;

means for reading the saved contents of system registers from memory and restoring such contents to the system registers after execution of the fault tracing routines.

19. The apparatus of claim 18 wherein said means for executing further comprises:

means for aligning address requests from the processor with addresses of the NMI routines.

20. The apparatus of claim 18 wherein said terminating means comprises:

means responsive to a last command in the system specific NMI routine for generating a termination signal;

said override control means in response to said termination signal terminates the override control signal and the memory control signal, and generates a CPU NMI signal, said processor in response to the CPU NMI signal requests commands from the operating system NMI routine in memory.

* * * * *